United States Patent
Shimado (10) Patent No.: US 9,772,611 B2
(45) Date of Patent: Sep. 26, 2017

(54) INTER-MAIN-APPARATUS INTERFACE DEVICE, MAIN-APPARATUS SYSTEM INCLUDING SAME, AND INTER-MAIN-APPARATUS INTERFACE METHOD

(71) Applicant: NEC Platforms, Ltd., Kawasaki-shi, Kanagawa (JP)

(72) Inventor: Shingo Shimado, Tokyo (JP)

(73) Assignee: NEC PLATFORMS, LTD, Tokyo ( * ) Notice: Subject to any disclaimer, the term of this patent is extended or adjusted under 35 U.S.C. 154(b) by 285 days.

(21) Appl. No.: 14/423,320

(22) PCT Filed: Aug. 28, 2013

(86) PCT No.: PCT/JP2013/072968
§ 371 (c)(1),
(2) Date: Feb. 23, 2015

(87) PCT Pub. No.: WO2014/034702
PCT Pub. Date: Mar. 6, 2014

(65) Prior Publication Data
US 2015/0316914 A1 Nov. 5, 2015

(30) Foreign Application Priority Data
Aug. 30, 2012 (JP) .................................. 2012-189662

(51) Int. Cl.
*G06F 13/38* (2006.01)
*H04W 4/18* (2009.01)
(Continued)

(52) U.S. Cl.
CPC ........... *G05B 15/02* (2013.01); *G06F 13/382* (2013.01); *H04M 3/00* (2013.01); *H04Q 3/58* (2013.01);
(Continued)

(58) Field of Classification Search
CPC ........ H04W 88/08–88/14; H04W 4/18–4/185; H04W 72/042–72/0433; H04L 1/22; G06F 11/08–11/20; G06F 13/38–13/387
See application file for complete search history.

(56) References Cited

U.S. PATENT DOCUMENTS

2007/0230328 A1* 10/2007 Saitou ....................... H04L 1/22
370/210
2012/0072751 A1 3/2012 Das et al.
(Continued)

FOREIGN PATENT DOCUMENTS

CN 1819554 A 8/2006
CN 101904190 A 12/2010
(Continued)

OTHER PUBLICATIONS

The extended European Search Report of EP Application No. 13833668 dated Jan. 27, 2016.
(Continued)

*Primary Examiner* — Marcus R Smith (57) ABSTRACT

There is provided an inter-main-apparatus interface device which, even if a first-standard main apparatus and a second-standard main apparatus are gathered in a main apparatus system, enables both of main apparatuses to function normally. The device comprises a control data interface provided between the first-standard main apparatus and the second-standard main apparatus for operating a controller included in the second-standard main apparatus on the basis of control data supplied from the first-standard main apparatus, and a content data interface provided between the first-standard main apparatus and the second-standard main apparatus for enabling the second-standard main apparatus, as controlled by the controller operating on the basis of the control data, to relay by multiplexing and demultiplexing, content data sent and received by a base station connected to (Continued)

the first-standard main apparatus and content data sent and received by a base station connected to the second-standard main apparatus.

19 Claims, 7 Drawing Sheets

(51) Int. Cl.
    *G05B 15/02*     (2006.01)
    *H04M 3/00*     (2006.01)
    *H04Q 3/58*     (2006.01)
    *H04W 92/24*     (2009.01)
    *H04W 88/12*     (2009.01)

(52) U.S. Cl.
    CPC .............. *H04W 4/18* (2013.01); *H04W 88/12* (2013.01); *H04W 92/24* (2013.01)

(56) References Cited

U.S. PATENT DOCUMENTS

| | | | |
|---|---|---|---|
| 2013/0089031 A1* | 4/2013 | Bertagna | H04W 88/08 370/328 |
| 2014/0106828 A1* | 4/2014 | Norman | H04W 52/0206 455/574 |
| 2015/0055572 A1* | 2/2015 | Ishikura | H04W 72/048 370/329 |

FOREIGN PATENT DOCUMENTS

| | | |
|---|---|---|
| CN | 101910972 A | 12/2010 |
| EP | 2296428 A1 | 3/2011 |
| JP | 61-082598 A | 4/1986 |
| JP | 62-078993 A | 4/1987 |
| JP | 06-038261 A | 2/1994 |
| JP | 10-084390 A | 3/1998 |
| JP | 11-331370 A | 11/1999 |
| JP | 2001-169372 A | 6/2001 |
| JP | 2002-218516 A | 8/2002 |
| JP | 2002-261924 A | 9/2002 |
| JP | 2003-037683 A | 2/2003 |
| JP | 2004-032505 A | 1/2004 |
| JP | 2008-124980 A | 5/2008 |
| JP | 2012-019268 A | 1/2012 |

OTHER PUBLICATIONS

International Search Report for PCT Application No. PCT/JP2013/072968, mailed on Nov. 5, 2013.

Chinese Office Action for CN Application No. 201380043902.7 issued on Nov. 3, 2015 with English Translation.

* cited by examiner

INTER-MAIN-APPARATUS INTERFACE DEVICE, MAIN-APPARATUS SYSTEM INCLUDING SAME, AND INTER-MAIN-APPARATUS INTERFACE METHOD

This application is a National Stage Entry of PCT/JP2013/072968 filed on Aug. 28, 2013, which claims priority from Japanese Patent Application 2012-189662 filed on Aug. 30, 2012, the contents of all of which are incorporated herein by reference, in their entirety.

TECHNICAL FIELD

The present invention relates to an inter-main-apparatus interface device which connects a main apparatus and other main apparatuses, particularly to an inter-main-apparatus interface device which connects a first-standard main apparatus and second-standard main apparatuses. Further, the present invention relates to a main-apparatus system including the inter-main-apparatus device and an inter-main-apparatus interface method performed by the inter-main-apparatus interface device.

BACKGROUND ART

Figure 1:
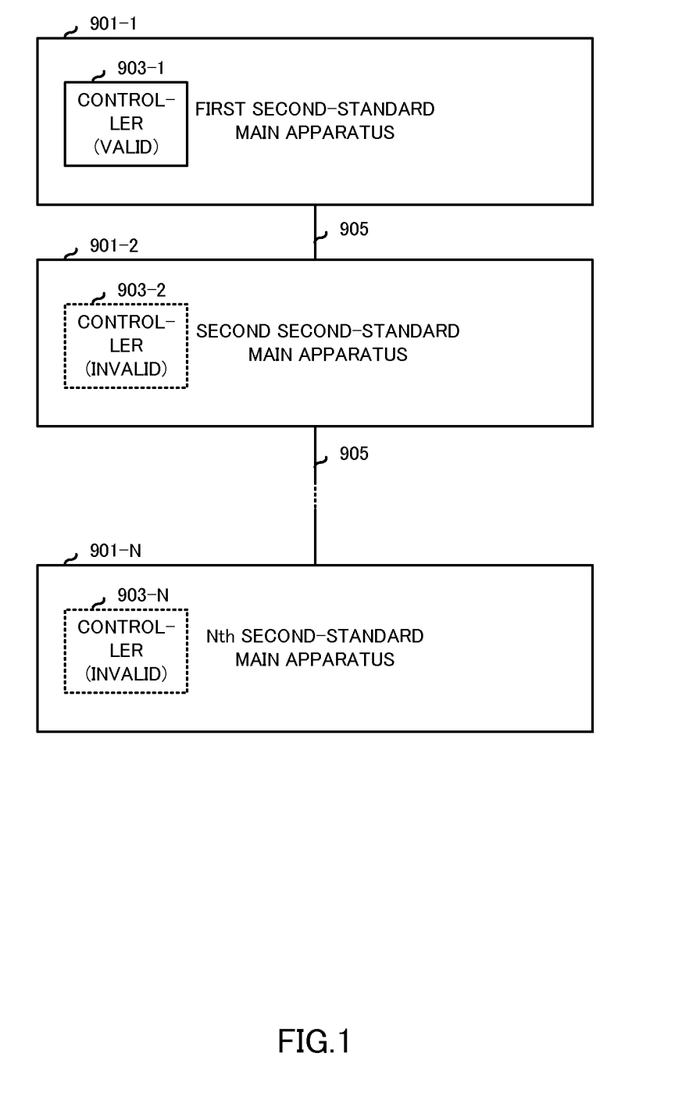
FIG. 1 A figure is a conceptual diagram illustrating a normal main apparatus system.

A configuration of a normal main apparatus system is illustrated in FIG. 1. Referring to FIG. 1, the normal main apparatus system includes a plurality of main apparatuses 901-1, 901-2, . . . and 901-N. Here, all of main apparatuses 901-1, 901-2, . . . and 901-N comply with the same standard, and are assumed to comply with a second-standard. Therefore, the main apparatuses 901-1, 901-2, . . . and 901-N are referred to as second-standard main apparatuses 901-1, 901-2, . . . and 901-N. Each of the plurality of second-standard main apparatuses can function independently. In that case, all operations of the second-standard main apparatus 901 are controlled by a controller 903 included therein. By combining a plurality of the second-standard main apparatuses, it is possible to build out a main apparatus system. In this case, as illustrated in FIG. 1, the plurality of second-standard main apparatuses 901-1, 901-2, . . . and 901-N are connected to each other by cables 905. Further, only a controller 903-1 in one main apparatus 901 (a first second-standard main apparatus 901-1 in an example of FIG. 1) is validated and other controllers (a controller 903-2 of a second second-standard controller 901-2 to a controller 903-N of a Nth second-standard controller 901-N) of other main apparatuses 901 are invalidated. Further, the first second-standard main apparatus 901-1 to the Nth second-standard main apparatus 901-N are controlled by the controller 903-1 included in the first second-standard main apparatus 901-1.

Figure 2:
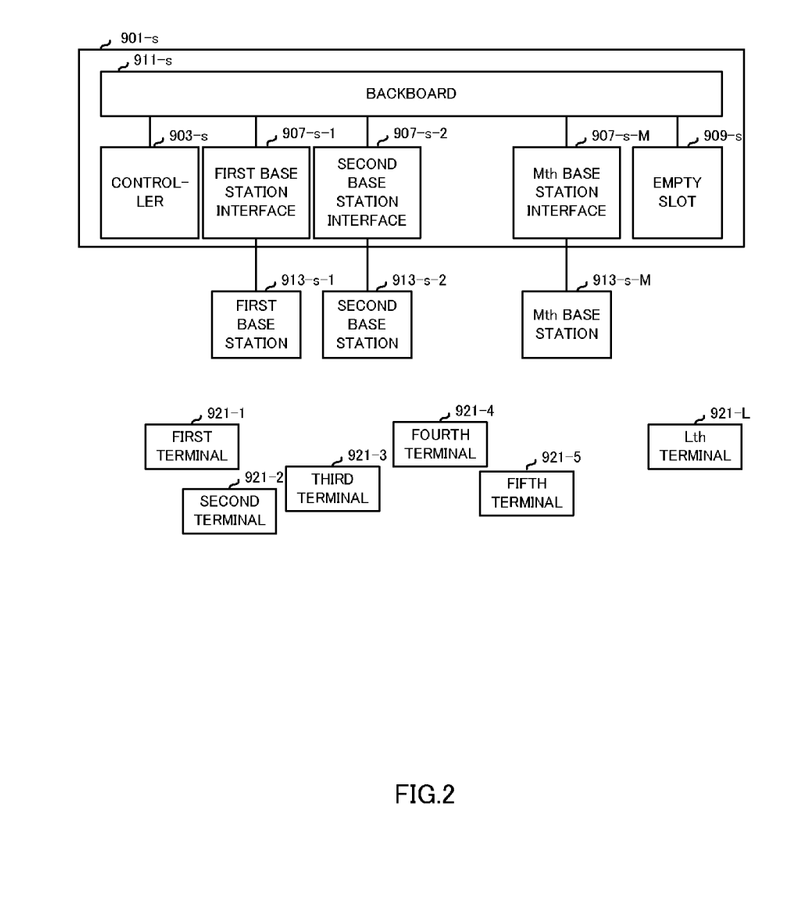
FIG. 2 A figure is a conceptual diagram illustrating an inner configuration of the second-standard main apparatus as illustrated in FIG. 1.

FIG. 2 is a conceptual diagram which illustrates an inner structure and so forth of the second-standard main apparatus 901-s (s=1, 2, . . . , N). Referring to FIG. 2, the second-standard main apparatus 901-s includes a controller 903-s, a first base station interface 907-s-1 to a Mth base station interface 907-s-M, an empty slot 909-s and a backboard 911-s. The backboard 911-s is used for connecting the controller 903-s, the first base station interface 907-s-1 to the Mth base station interface 907-s-M and the empty slot 909-s mutually. The controller 903-s and the first base station interface 907-s-1 to the Mth base station interface 907-s-M have forms of card base plates inserted into slots of the backboard 911-s. A slot into which the card base plate is not inserted is the empty slot 909-s.

The first base station interface 907-s-1 to the Mth base station interface 907-s-M are connected to a first base station 913-s-1 to a Mth base station 913-s-M respectively.

A first terminal 921-1 to a Lth terminal 921-L perform radio communication with any base station among the first base station 913-s-1 to the Mth base station 913-s-M according to a predetermined communication standard. The predetermined standard is, for example, PHS (Personal Handyphone System), Wireless LAN (Local Area Network) standard, W-CDMA (Wideband-Code Division Multiple Access), or MIMO (Multiple Input Multiple Output).

On the basis of above configuration, in the main apparatus system, one terminal 921 connected to any base station 913-s-m (m=1, 2, . . . , M) connected to any second-standard main apparatus 901-s (s=1, 2, . . . , N) can communicate not only with another terminal 921 connected to any base station 913-s-m' (m'=1, 2, . . . , M) connected to the main apparatus 901-s but also with the other terminal 921 connected to any base station 913-s'-m' (m'=1, 2, . . . , M) connected to any other main apparatus 901-s' (s'=1, 2, . . . , N). Therefore, the backboard 911-s relays data sent and received between the terminal 921 connected to any base station 913 included in the main apparatus system and the terminal 921' connected to any base station 913' included in the main apparatus system. This relay is performed by multiplexing the data with other data between other terminals and further demultiplexing them.

PTL 1 discloses an art that a switching equipment is connected to a computer which functions as a server device wherein the switching equipment does not include a time switch function and a switching control function which are included in a normal switching equipment, and a time switcher and a CPU included in the server device act for the time switch function and the switching control function.

CITATION LIST

Patent Literature

{PTL 1} Japanese Patent Application Publication No. 2002-261924

SUMMARY OF INVENTION

Technical Problem

By the way, as illustrated in FIG. 1, it is possible that the second-standard main apparatuses 901-1, 901-2, . . . and 901-N are connected to each other via cables 905 and the controller 903-1 included in the first second-standard main apparatus 910-1 controls the second-standard main apparatuses 901-1, 901-2, . . . and 901-N, because all of these main apparatuses comply with the second standard which is the same standard.

Therefore, even if a main apparatus which complies with a first-standard as different from the second-standard is connected to above main apparatus system merely via a cable and a controller in the main apparatus is invalidated, the main apparatus which complies with the first-standard cannot operate normally. Therefore, it is impossible to extend above main apparatus system easily.

Also, even if the main apparatus which complies with the first-standard as different from the second standard is connected to above main apparatus system merely via a cable, the controller of the main apparatus is validated and the controllers of all second-standard main apparatuses are invalidated, neither of the main apparatus which complies with the first-standard and the main apparatuses which comply with the second-standard cannot operate normally. Therefore, it is impossible to extend above main apparatus system easily.

Here, in a case where a currently-used main apparatus system is composed of a plurality of second-standard main apparatuses and a first-standard main apparatus which has higher function than the second-standard main apparatuses is developed by a manufacturer, a user considers about introduction of a first-standard function. However, if it is necessary to replace whole of the main apparatus system, the user hesitates about the introduction in terms of both of introduction cost and introduction work. Therefore, if it is possible that a main apparatus system configured by using the second-standard main apparatuses which has been previously used as is and adding one first-standard main apparatus includes the first-standard function, the introduction has merits in terms of both of introduction cost and introduction work, and the user does not hesitate about the introduction. Also, in terms of social economy and environment, the introduction has merits.

In the art as disclosed in PTL 1, although the server device includes the time switch function and the switching control function which should be primarily included in the switching device, both of the switching device and the server device operate according to a common standard. Therefore, transform processing between different standards is impossible and therefore, it is impossible to connect the first-standard device and the second-standard device.

Then, the object of the present invention is to provide an inter-main-apparatus interface device wherein, even if the first-standard main apparatus and the second-standard main apparatus are gathered together in the main apparatus system, both of main apparatuses operate normally, a main-apparatus system including the inter-main-apparatus interface device, and an inter-main-apparatus interface method performed by the inter-main-apparatus interface device.

Solution to Problem

According to the present invention, there is provided an inter-main-apparatus interface device, comprising: a control data interface provided between a first-standard main apparatus and a second-standard main apparatus for operating a controller included in the second-standard main apparatus on the basis of control data supplied from the first-standard main apparatus; and a content data interface provided between the first-standard main apparatus and the second-standard main apparatus for enabling the second-standard main apparatus, as controlled by the controller operating on the basis of the control data, to relay, by multiplexing and demultiplexing, content data sent and received by a base station connected to the first-standard main apparatus and content data sent and received by a base station connected to the second-standard main apparatus.

Further, according to the present invention, there is provided an inter-main-apparatus interface method, comprising the steps of: that a controller included in a second-standard main apparatus is operated on the basis of control data supplied from a first-standard main apparatus using a control data interface provided between the first-standard main apparatus and the second-standard main apparatus; and that the second-standard main apparatus, as controlled by the controller being operated on the basis of the control data, relays, by multiplexing and demultiplexing, content data sent and received by a base station connected to the first-standard main apparatus and content data sent and received by a base station connected to the second-standard main apparatus using a content data interface provided between the first-standard main apparatus and the second-standard main apparatus.

Furthermore, according to the present invention, there is provided an inter-main-apparatus interface program for causing a computer to function as an inter-main-apparatus interface, the program causing the computer to function as: a control data interface provided between a first-standard main apparatus and a second-standard main apparatus for operating a controller included in the second-standard main apparatus on the basis of control data supplied from the first-standard main apparatus; and a content data interface provided between the first-standard main apparatus and the second-standard main apparatus for enabling the second-standard main apparatus, as controlled by the controller operating on the basis of the control data, to relay, by multiplexing and demultiplexing, content data sent and received by a base station connected to the first-standard main apparatus and content data sent and received by a base station connected to the second-standard main apparatus.

Advantageous Effects of the Invention

According to the present invention, it is possible that both of the first-standard main apparatuses and the second-standard main apparatuses operate normally even if both of those main apparatuses are gathered together in the main apparatus system.

BRIEF DESCRIPTION OF DRAWINGS

FIG. 5A figure is a block diagram illustrating details about an inner configuration of a first connection card 107 and details about an inner configuration of a second connection card 109.

DESCRIPTION OF EMBODIMENTS

We explain about embodiments for implementing the present invention in detail by referring to figures.

Figure 3:
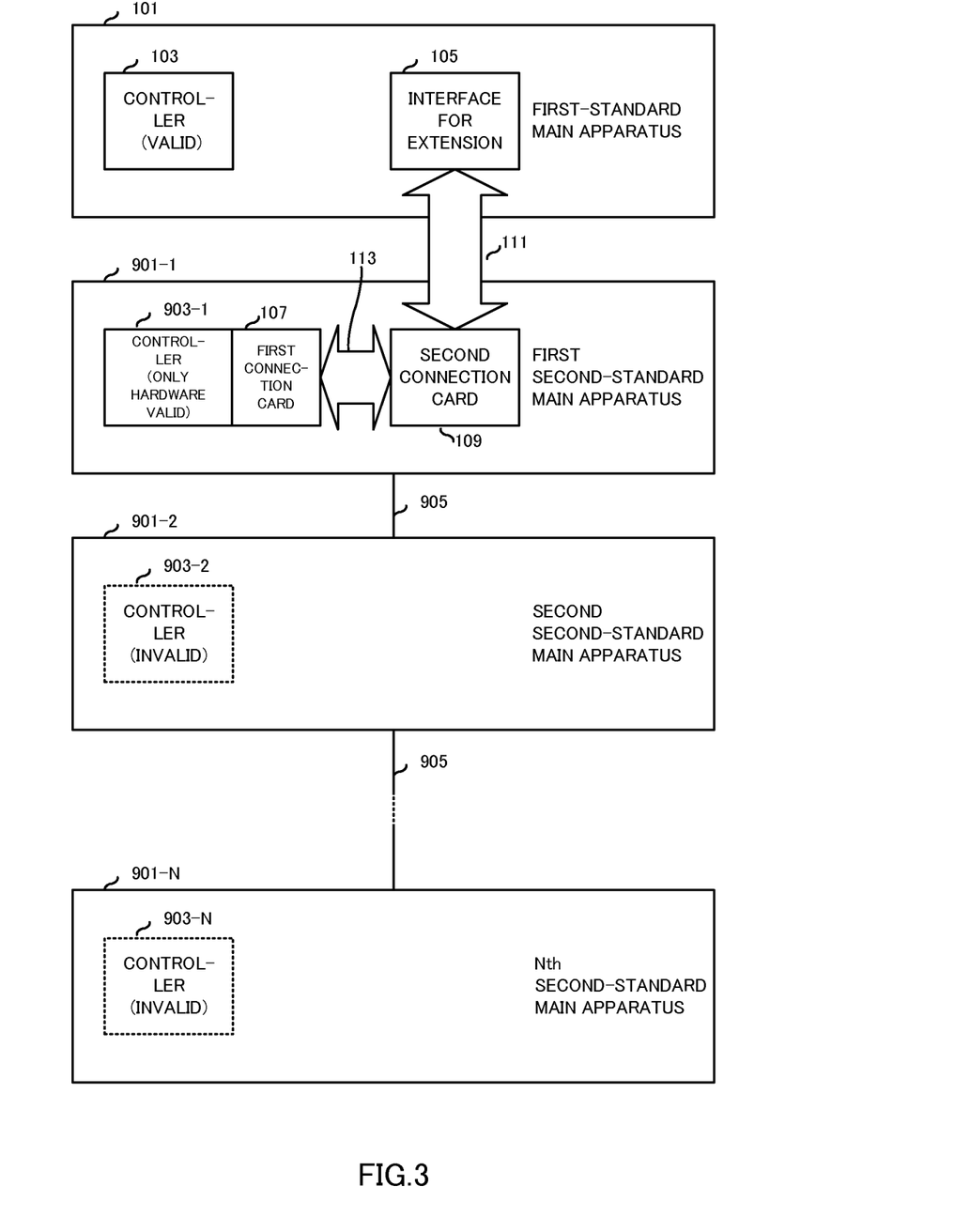
FIG. 3 A figure is a conceptual diagram illustrating an outline of whole of the main apparatus system according to an embodiment of the present invention.

FIG. 3 is a conceptual diagram which illustrates an outline of whole of main apparatus system according to an embodiment of the present invention.

Referring to FIG. 3, a main apparatus system according to the embodiment of the present invention includes a first-standard main apparatus 101, a first second-standard main apparatus 901-1, a second second-standard main apparatus 901-2, . . . , a Nth second-standard main apparatus 901-N.

The first second-standard main apparatus 901-1, the second second-standard main apparatus 901-2, . . . , and the Nth second-standard main apparatus 901-N are connected to each other via cables 905 just like an ordinary art. Contrary to this, the first-standard main apparatus 101 and the first second-standard main apparatus 901-1 are connected to each other via a cable 111 according to the present invention.

The first-standard main apparatus 101 includes a controller 103 and an interface 105 for extension. Other components are described later.

The controller 103 complies with the first-standard. The interface 105 for extension is used for connecting the first-standard main apparatus 101 and the first second-standard main apparatus 901-1.

Seeing the first second-standard main apparatus 901-1 in FIG. 3, although the controller 903-1 is similar to normal controllers 903-1 illustrated in FIGS. 1 and 2, only hardware is validated. A firmware (not-illustrated) in the controller 903-1 which is validated on the basis of ordinary art is used for operating the hardware in the controller 903-1 according to the first-standard. The firmware in the controller 903-1 is written in, for example, ROM (Read Only Memory), and a firmware child card including this ROM is connected to the hardware in the controller 903-1 via a PCI bus (Peripheral Components Interconnect bus).

In the present embodiment, the firmware child card of the controller 903-1 is removed from the controller 903-1, and instead of this, a first connection card 107 is connected to the hardware of the controller 903-1 via the PCI bus. Therefore, the hardware of the controller 903-1 operates according to data supplied from and to the first connection card 107. The first connection card 107 is mounted on the controller 903-1, for example, as a child card of the controller 903-1. Details of the first connection card 107 are described later.

A second connection card 109 is inserted into an empty slot 909-2 (refer to FIG. 2) of the first second-standard main apparatus 901-1. The first connection card 107 and the second connection card 109 are connected to each other via a cable 113. The second connection card 109 and the interface 105 for extension are connected to each other via the cable 111. Details of the second connection card 109 are described later.

The first-standard main apparatus 101 is controlled by the controller 103 included therein. Further, the controller 903-1 of the first second-standard main apparatus 901-1 operates according to data supplied from and to the first connection card 107 as noted above. Among the data, especially control data supplied from the first connection card 107 to the hardware of the controller 903-1 is supplied from the first-standard main apparatus 101 to the first connection card 107 via the interface 105 for extension, the cable 111, the second connection card 109 and the cable 113. Therefore, the hardware of the controller 903-1 of the first second-standard main apparatus 901-1 operates according to the control data supplied from the first-standard main apparatus 101.

Further, all of a controller 903-2 of the second second-standard main apparatus 901-2 to a controller 903-N of the Nth second-standard main apparatus 901-N are invalidated, and the first second-standard main apparatus 901-1 to the Nth second-standard main apparatus 901-N are controlled by the controller 903-1 (directly by the hardware of the controller 903-1) included in the first second-standard main apparatus 901-1.

Therefore, the first second-standard main apparatus 910-1 to the Nth second-standard main apparatus 901-N operate according to the control data supplied from the first-standard main apparatus 101.

Therefore, whole of the main apparatus system including the first-standard main apparatus 101 and the first second-standard main apparatus 901-1, the second second-standard main apparatus 901-2, . . . , and the Nth second-standard main apparatus 901-N are controlled by the controller 103 included in the first-standard main apparatus 101.

Figure 4:
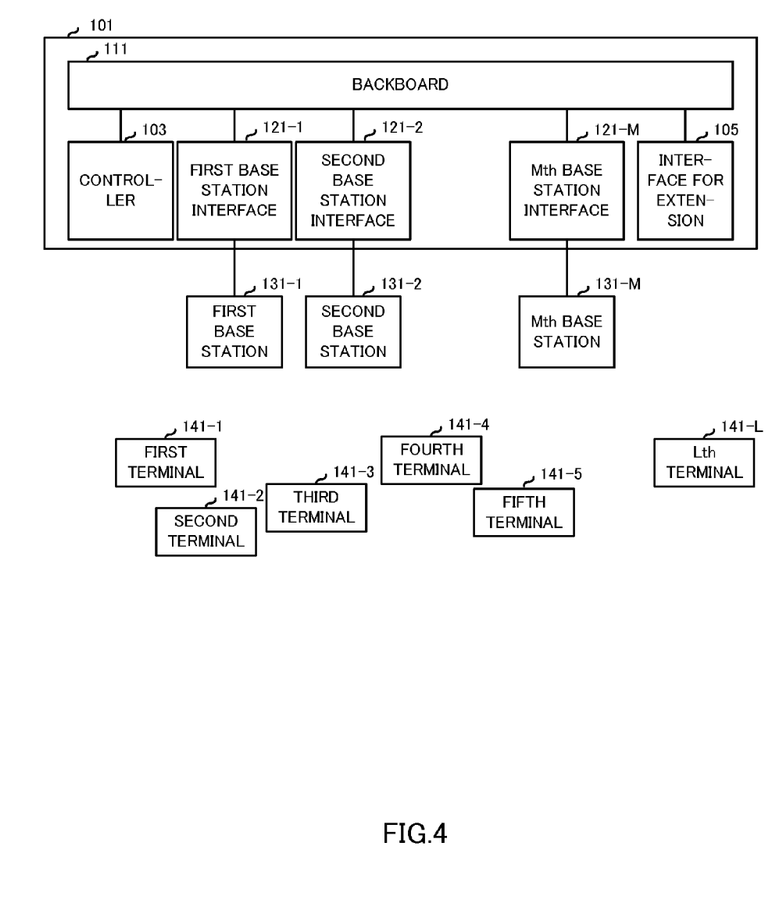
FIG. 4 A figure is a conceptual diagram illustrating an inner configuration of the first-standard main apparatus 101 according to an embodiment of the present invention.

FIG. 4 is a conceptual diagram illustrating an inner configuration of the first-standard main apparatus 101 according to the embodiment of the present invention. Referring to FIG. 4, the first-standard main apparatus 101 includes the controller 103, a first base station interface 121-1 to a Mth base station interface 121-M, the interface 105 for extension, and a backboard 111. The backboard 111 is used for connecting the controller 103, the first base station interface 121-1 to the Mth base station interface 121-M and the interface 105 for extension mutually. The controller 103, the first base station interface 121-1 to the Mth base station interface 121-M, and the interface 105 for extension have forms of card base plates inserted into slots of the backboard 111.

The first base station interface 121-1 to the Mth base station interface 121-M are connected to a first base station 131-1 to a Mth base station 131-M respectively.

A first terminal 141-1 to a Lth terminal 141-L perform radio communication with any base station among the first base station 131-1 to the Mth base station 131-M according to a predetermined communication standard. The predetermined standard is, for example, PHS (Personal Handyphone System), Wireless LAN (Local Area Network) standard, W-CDMA (Wideband-Code Division Multiple Access), or MIMO (Multiple Input Multiple Output).

On the basis of above configuration, in the main apparatus system, one terminal 141 connected to any base station 131-$m$ (m=1, 2, . . . , M) connected to the first-standard main apparatus 101 can communicate not only with another terminal 141 connected to any base station 131-$m'$ (m'=1, 2, . . . , M) connected to the first-standard main apparatus 101 but also with the other terminal 921 connected to any base station 913-$s$-$m$ (m=1, 2, . . . , M) connected to any second-standard main apparatus 901-$s$ (s=1, 2, . . . , N). Furthermore, just like a case of ordinary art, in the main apparatus system, one terminal 921 connected to any base station 913-$s$-$m$ (m=1, 2, . . . , M) connected to any second-standard main apparatus 901-$s$ (s=1, 2, . . . , N) can communicate with another terminal 921 connected to any base station 913-$s'$-$m'$ (m'=1, 2, . . . , M) connected to any other main apparatus 901-$s'$ (s'=1, 2, . . . , N).

Therefore, each of the backboard 111 and the backboard 911-$s$ relays data sent and received between the terminal 141 connected to any base station 131 or the terminal 921 connected to any base station 913 included in the main apparatus system, and the terminal 141' connected to any base station 131' or the terminal 921' connected to any base station 913' included in the main apparatus system. This relay is performed by multiplexing this data and data between other terminals and further demultiplexing them.

Figure 5:
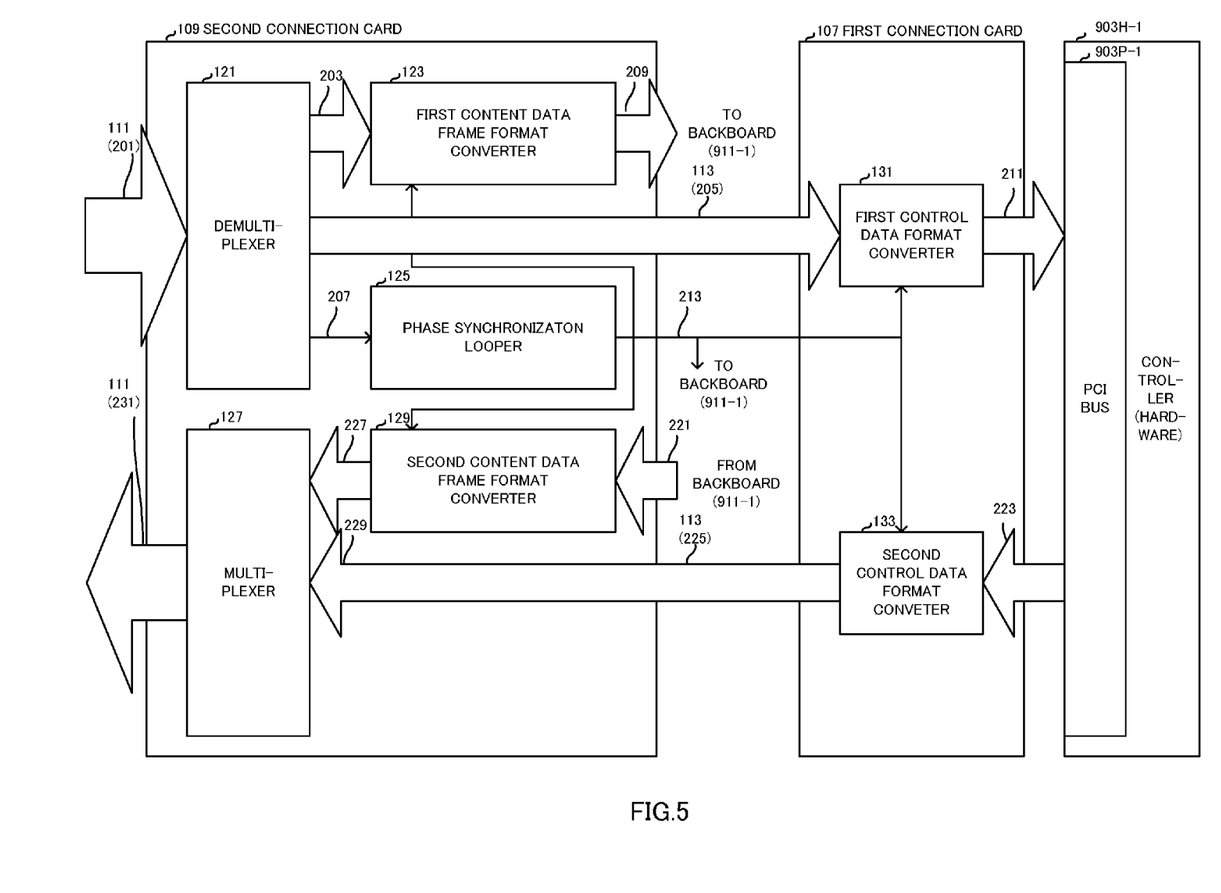

FIG. 5 is a block diagram illustrating details of an inner configuration of the first connection card 107 and details of an inner configuration of the second connection card 109.

Referring to FIG. 5, the first connection card 107 includes a first control data frame format converter 131 and a second control data frame format converter 133. Further, the second connection card 109 includes a demultiplexer 121, a first content data frame format converter 123, a phase synchronization looper 125, a multiplexer 127 and a second content data frame format converter 129. Here, the content data includes at least part of sound data, movie data, still image data, text data, electronic document data and so forth. However, the content data may be another type of content data.

The demultiplexer 121 receives supplied multiplexing data 201 that the first control data, the first content data and a clock signal are multiplexed from the interface 105 for extension via the cable 111, performs a demultipexing process to the multiplexing data, and separately supplies the first control data 205, the first content data 203 and the clock signal 207 which are separated by the process. Here, "first" included in "the first control data" and "first" included in "the first content data" indicate a transmission along a direction from the first-standard main apparatus 101 to the first second-standard main apparatus 901-1. In a later explanation, terms of "a second control data" and "a second content data" are used. "Second" included in these terms indicate a transmission along a direction from the first second-standard main apparatus 901-1 to the first-standard main apparatus 101. In the multiplexing data, the first control data and the first content data are frame-processed according to a frame format of the first-standard main apparatus, and even after demultiplexing, the first control data and the first content data are frame-processed according to the frame format of the first-standard main apparatus.

The phase synchronization looper 125 receives the clock signal 207 from the demultiplexer 121. Further, the phase synchronization looper 125 synchronizes with the supplied clock signal and supplies a stable clock signal as a supplied clock signal 213. In each portion of the second connector card 109 and each portion of the first connector card 107, the supplied clock signal 213 is used as a clock signal therein. Further, the supplied clock signal is distributed to whole of the main apparatus system via the backboard 911-1 and used as a system clock signal in the whole of the main apparatus system.

Figure 6A:
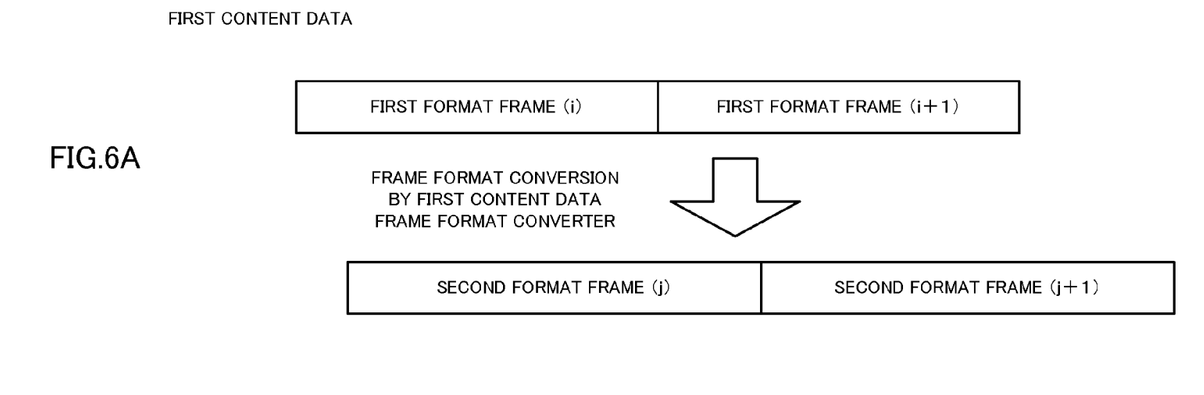
FIG. 6A A figure is a conceptual diagram illustrating a conversion of first content data.

As illustrated in a timing diagram as FIG. 6A, the first content data frame format converter 123 receives the first content data 203 from the demultiplexer 121 and converts a first content data frame format from the frame format of the first-standard main apparatus 101 to the frame format of the second-standard main apparatus 901. For the conversion of the frame format, for example, a buffer memory is included in the first content data frame format converter 123 inside. Further, for the conversion of the frame format, for example, both of a frame timing signal according to the frame format of the first-standard main apparatus 101 and a frame timing signal according to the frame format of the second-standard main apparatus 901 are used. The first content data 209 including the frame format of the second-standard main apparatus 901 is supplied from the first content data frame format converter 123 to the backboard 911-1 of the second-standard main apparatus 901-1, and multiplexed and demultiplexed with other content data there, and thereby being relayed.

Figure 7A:
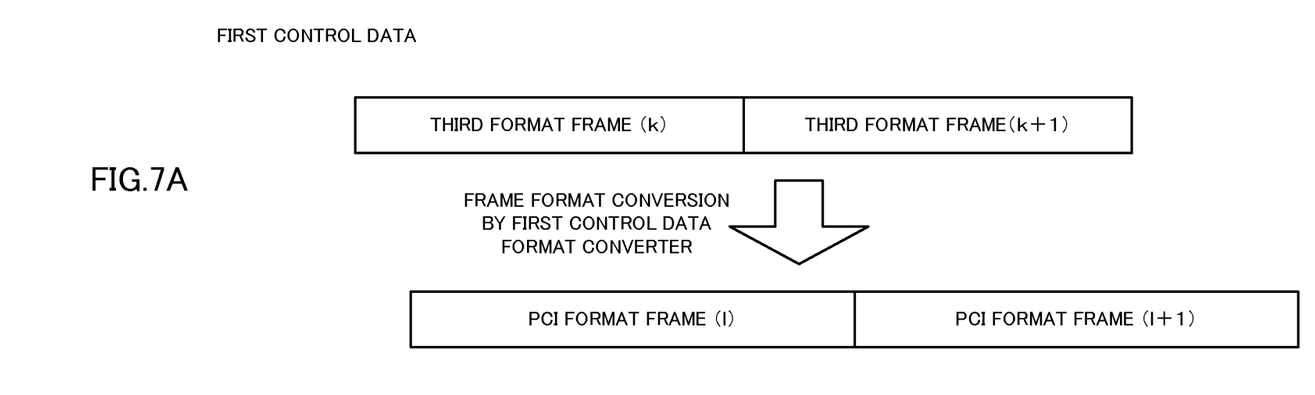
FIG. 7A A figure is a conceptual diagram illustrating a conversion of first control data.

As illustrated in a timing diagram as FIG. 7A, the first control data format converter 131 receives the first control data 205 from the demultiplexer 121 via the cable 113, and converts the format of the first control data from the frame format of the first-standard main apparatus 101 to a format complying with a specification of a PCI bus 903P-1 which is an interface between a hardware and a firmware in the controller 903-1 of the second-standard main apparatus 901. For the conversion of the format, for example, a buffer memory is included in the first control data format converter 131 inside. Further, for the conversion of the format, for example, both of a frame timing signal complying with the frame format of the first-standard main apparatus 101 and various control signals in the PCI bus are used. The first control data 211 complying with the specification of the PCI bus is supplied to a hardware 903H-1 of the controller 903-1 via the PCI bus 903P-1.

A second content data 221 which is content data including a frame format of the second-standard main apparatus 901 and should be supplied from the first second-standard main apparatus 901-1 to the first-standard main apparatus 101 is multiplexed and demultiplexed with other content data in the backboard 911-1, and then, is supplied from the backboard 911-1 to the second content data frame format converter 129.

Figure 6B:
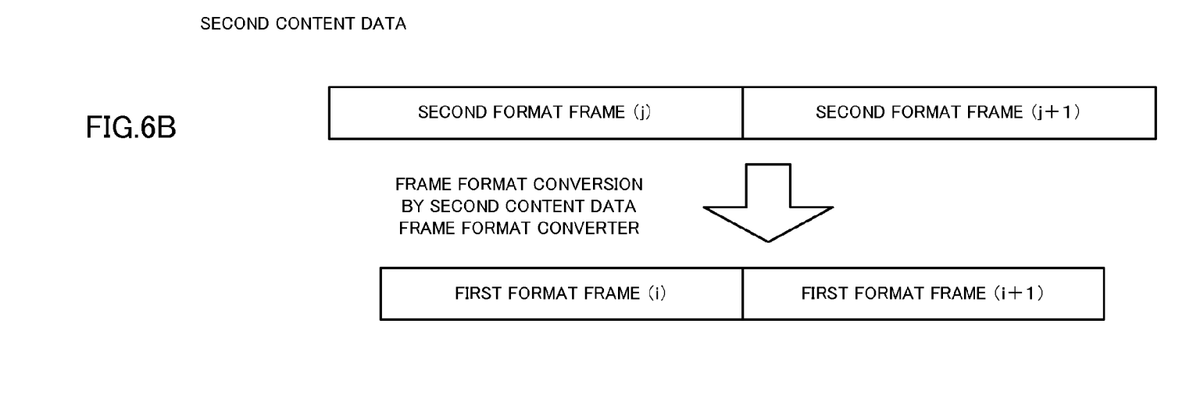
FIG. 6B A figure is a conceptual diagram illustrating a conversion of second content data.

As illustrated in a timing diagram as FIG. 6B, the second content data frame format converter 129 converts the frame format of the second content data from the frame format of the second-standard main apparatus 901 to the frame format of the first-standard main apparatus 101. For the conversion of the frame format, for example, a buffer memory is included in the second content data frame format converter 129 inside. Further, for the conversion of the frame format, for example, both of a frame timing signal pursuant to the frame format of the first-standard main apparatus 101 and a frame timing signal pursuant to the frame format of the second-standard main apparatus 901 are used.

Figure 7B:
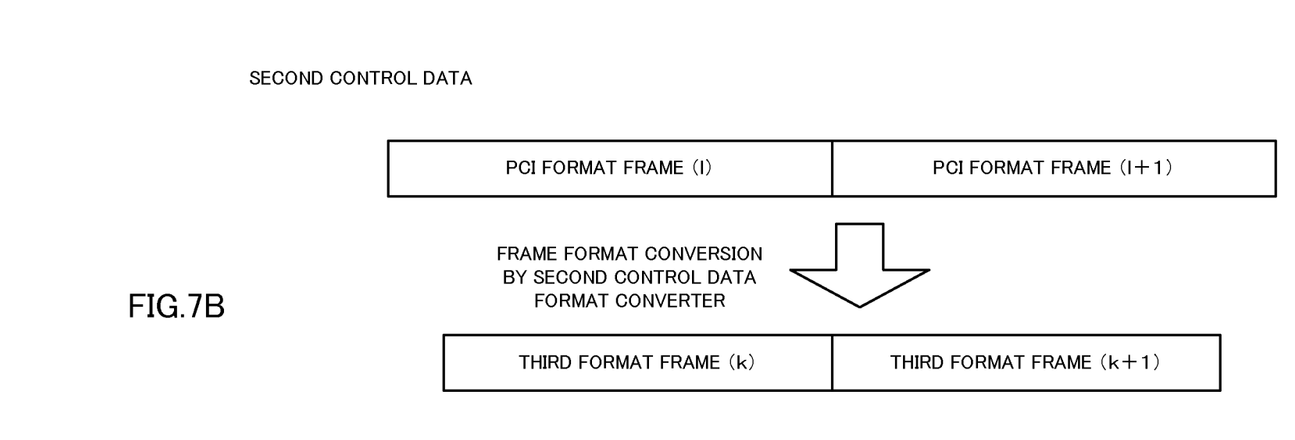
FIG. 7B A figure is a conceptual diagram illustrating a conversion of second control data.

As illustrated in a timing diagram of FIG. 7B, the second control data format converter 133 receives the second control data 223 from the hardware 903H-1 of the controller 903-1 via the PCI bus 903P-1, and converts the format of the second control data 223 from the format complying with the PCI bus 903P-1 which is the interface between the hardware 903H-1 and the firmware in the controller 903-1 of the second-standard main apparatus 901 to the frame format of the first-standard main apparatus 101. Further, for the conversion of the format, for example, a buffer memory is included in the second control data format converter 133 inside. Further, for the conversion of the format, for example, both of the frame timing signal pursuant to the frame format of the first-standard main apparatus and various control signals in the PCI bus are used.

Here, the timing diagrams as shown in FIGS. 6A, 6B, 7A and 7B, are schematic for the explanation. In fact, the content data and/or control data may be continuous or discontinuous before and/or after the conversion. For example, valid data may be included only at the timing when a supplying destination after the conversion can receive. To that end, for example, data after the conversion may be discontinuous.

Further, the first content data does not lose an information which the first content data themselves have even after the format is converted in the first content data frame format converter 123. Similarly, the second content data does not lose an information which the second content data themselves have even after the format is converted in the second content data frame format converter 129. Similarly, the first control data does not lose an information which the first control data themselves have even after the format is converted in the first control data frame format converter 131. Therefore, the hardware 903H of the controller 903 of the first second-standard main apparatus 901-1 can operate under the initiative of the first-standard main apparatus 101. Similarly, the second control data does not lose an information which the second control data themselves have even after the format is converted in the second control data frame format converter 133.

The multiplexer 127 receives the second content data from the second content data frame format converter 129, receives the second control data from the second control data format converter 133, multiplexes these received data, and supplies the acquired multiplexing data 231 to the interface 105 for extension via the cable 111.

Because the multiplexing data 231 are pursuant to the frame format of the first-standard main apparatus 101, the second content data included in this multiplexing data 231 are multiplexed and demultiplexed with other content data in the backboard 111 of the first-standard main apparatus 101 without further frame format conversion. Also, the second control data included in the multiplexing data 231 are multiplexed and demultiplexed with other control data in the backboard 111 of the first-standard main apparatus 101 without further frame format conversion.

Above-described first control data includes main control data for controlling an operation of the hardware 903H-1 of the controller 903-1 of the first second-standard main apparatus 901-1. The hardware 903H-1 controlled by this main control data performs, for example, timing control for multiplexing and demultiplexing of the content data in the backboard 911-1.

Further, above-described first control data are call control data for establishing a call between terminals, and include first direction call control data as call control data which are transmitted along a direction from the first-standard main apparatus 101 to the first second-standard main apparatus 901-1.

Further, above-described second control data are data relating to main control data which control operations of the hardware 903H-1 of the controller 903-1 of the first second-standard main apparatus 901-1, and include data which are transmitted along a direction from the second-standard main apparatus 901-1 to the first first-standard main apparatus 101.

Further, above-described second control data are call control data for establishing a call between terminals, and include second direction call control data which are call control data transmitted along a direction from the second-standard main apparatus 901-1 to the first first-standard main apparatus 101.

First effect brought by the present embodiments is a fact that the same function as the first-standard main apparatus is provided for the second-standard main apparatus. Also, it is possible that the second-standard main apparatus after system extension inherits functions of the second-standard main apparatus before the system extension. This is because the second-standard main apparatus becomes an extension shelf from a standpoint of the first-standard main apparatus.

Second effect brought by the present embodiment is a fact that a system termination time because of wiring work, apparatus setting and so forth is short. This is because a new main apparatus system can be constructed merely by mounting additionally the first-standard main apparatus on a rack where the first to the Nth second-standard main apparatuses are mounted, exchanging the firmware of the controller of the first first-standard main apparatus into the first connection card, inserting the second connection card into the empty slot of the first first-standard main apparatus, and connecting predetermined cables.

Meanwhile, each of above-described first connection card, second connection card and interface for extension may be achieved by hardware, software, or combination thereof. Further, the inter-main apparatus connection method executed by the above-described first connection card, second connection card and interface for extension may be achieved by hardware, software, or combination thereof. Here, the expression "achieved by software" means "achieved by a computer reading and executing a program".

A program may be stored using various types of a non-transitory computer readable medium and may be supplied to the computer. The non-transitory computer readable medium includes various types of a tangible storage medium. Examples of the non-transitory computer readable medium include a magnetic recording medium (e.g., flexible disk, magnetic tape, hard disk drive), a magnet-optical recording medium (e.g., magneto-optical disk), a CD-ROM (Read Only Memory), a CD-R, a CD-R/W, a semiconductor memory (e.g., mask ROM, a PROM (Programmable ROM), an EPROM (Erasable PROM), a flash ROM, and a RAM (random access memory)). Further, the program may be supplied to the computer by various types of a transitory computer readable medium as well. Examples of the transitory computer readable medium include an electric signal, an optical signal, and an electromagnetic wave. The transitory computer readable medium may supply the program to the computer via a wired channel such as an electric cable or an optical fiber, or via a wireless channel.

A part or entirety of the above-described embodiments may be described as in the following supplementary notes, but are not limited thereto.

{Supplementary Note 1}

An inter-main-apparatus interface device, comprising:
a control data interface provided between a first-standard main apparatus and a second-standard main apparatus for operating a controller included in the second-standard main apparatus on the basis of control data supplied from the first-standard main apparatus; and
a content data interface provided between the first-standard main apparatus and the second-standard main apparatus for enabling the second-standard main apparatus, as controlled by the controller operating on the basis of the control data, to relay, by multiplexing and demultiplexing, content data sent and received by a base station connected to the first-standard main apparatus and content data sent and received by a base station connected to the second-standard main apparatus.

{Supplementary Note 2}

The inter-main-apparatus interface device according to Supplementary note 1, wherein
the control data includes main control data for enabling the second-standard main apparatus, as controlled by the controller operating on the basis of the control data, to relay, by multiplexing and demultiplexindg, content data sent and received by the base station connected to the first-standard main apparatus and content data sent and received by the base station connected to the second-standard main apparatus.

{Supplementary Note 3}

The inter-main-apparatus interface device according to Supplementary note 1 or 2, wherein
the control data includes a first direction call control data supplied from the first-standard main apparatus to the second-standard main apparatus among call control data for controlling a call between a terminal connected to the base station connected to the first-standard main apparatus and a terminal connected to the base station connected to the second-standard main apparatus or a terminal connected to a base station connected to another second-standard main apparatus connected to the second-standard main apparatus.

{Supplementary Note 4}

The inter-main-apparatus interface device according to any one of Supplementary notes 1 to 3, wherein
the control data interface comprises a first converter configured to convert the control data supplied from the first-standard main apparatus to make the control data be pursuant to a specification of an interface included in the controller, and
the control data becoming pursuant to the specification of the interface by the first converter is supplied to the controller via the interface.

{Supplementary Note 5}

The inter-main-apparatus interface device according to any one of Supplementary notes 1 to 4, wherein
a second direction call control data supplied from the second-standard main apparatus to the first-standard main apparatus among call control data for controlling a call between the terminal connected to the base station connected to the first-standard main apparatus and the terminal connected to the base station connected to the second-standard main apparatus or the terminal as connected to the base station connected to another second-standard main apparatus connected to the second-standard main apparatus is output from the interface included in the controller according to the specification of the interface, and
the control data interface comprises a second converter configured to convert the second direction call control data supplied from the interface included in the controller according to the specification of the interface to make the second direction call control data be pursuant to a specification of the first-standard main apparatus.

{Supplementary Note 6}

The inter-main-apparatus interface device according to any one of Supplementary notes 1 to 5, wherein
the content data interface comprises:
a first frame format converter configured to convert a frame format of content data supplied from the first-standard main apparatus from a frame format of the first-standard main apparatus to a frame format of the second-standard main apparatus; and
a second frame format converter configured to receive content data that is demultiplexed in the second-standard main apparatus and to be supplied to the first-standard main apparatus and convert a frame format of the received content data from the frame format of the second-standard main apparatus to the frame format of the first-standard main apparatus,
the conversion of the first frame format converter enables the second-standard main apparatus to multiplex the content data supplied from the first-standard main apparatus with other content data, and
the conversion of the second frame format converter enables the first-standard main apparatus to multiplex the content data supplied from the second-standard main apparatus with other content data.

{Supplementary Note 7}

The inter-main-apparatus interface device according to any one of Supplementary notes 1 to 6, further comprising:
a clock interface for enabling the second-standard main apparatus to operate using a clock signal generated by the first-standard main apparatus.

{Supplementary Note 8}

The inter-main-apparatus interface device according to any one of Supplementary notes 1 to 7, wherein
the control data and the content data supplied from the first-standard main apparatus to the second-standard main apparatus are multiplexed,
the inter-main-apparatus interface device further comprises a demultiplexer configured to demultiplex the multiplexed control data and content data.

{Supplementary Note 9}

The inter-main-apparatus interface device according to any one of Supplementary notes 1 to 7, further comprising:
a multiplexer configured to multiplex the control data and the content data which are to be supplied from the second-standard main apparatus to the first-standard main apparatus, wherein
the control data and the content data multiplexed by the multiplexer are supplied to the first-standard main apparatus.

{Supplementary Note 10}

A main-apparatus system comprising the inter-main-apparatus interface device according to any one of claims 1 to 9, the first-standard main apparatus and the second-standard main apparatus.

{Supplementary Note 11}

The main-apparatus system according to claim 10, further comprising:
one or more other second-standard main apparatuses controlled by the controller of the second-standard main apparatus.

{Supplementary Note 12}

An inter-main-apparatus interface method, comprising the steps of:
that a controller included in a second-standard main apparatus is operated on the basis of control data supplied from a first-standard main apparatus using a control data interface provided between the first-standard main apparatus and the second-standard main apparatus; and
that the second-standard main apparatus, as controlled by the controller being operated on the basis of the control data, relays, by multiplexing and demultiplexing, content data sent and received by a base station connected to the first-standard main apparatus and content data sent and received by a base station connected to the second-standard main apparatus using a content data interface provided between the first-standard main apparatus and the second-standard main apparatus.

{Supplementary Note 13}

The inter-main-apparatus interface method according to Supplementary note 12, wherein
the control data includes main control data for enabling the second-standard main apparatus, as controlled by the controller operating on the basis of the control data, to relay, by multiplexing and demultiplexindg, content data sent and received by the base station connected to the first-standard main apparatus and content data sent and received by the base station connected to the second-standard main apparatus.

{Supplementary Note 14}

The inter-main-apparatus interface method according to Supplementary note 12 or 13, wherein
the control data includes a first direction call control data supplied from the first-standard main apparatus to the second-standard main apparatus among call control data for controlling a call between a terminal connected to the base station connected to the first-standard main apparatus and a terminal connected to the base station connected to the second-standard main apparatus or a terminal connected to a base station connected to another second-standard main apparatus connected to the second-standard main apparatus.

{Supplementary Note 15}

The inter-main-apparatus interface method according to any one of Supplementary notes 12 to 14, further comprising:
  a first converting step in which, the control data interface converts the control data supplied from the first-standard main apparatus to make the control data be pursuant to a specification of an interface included in the controller, and
  the control data becoming pursuant to the specification of the interface by the first converter is supplied to the controller via the interface.

{Supplementary Note 16}

The inter-main-apparatus interface method according to any one of Supplementary notes 12 to 15, wherein
  a second direction call control data supplied from the second-standard main apparatus to the first-standard main apparatus among call control data for controlling a call between the terminal connected to the base station connected to the first-standard main apparatus and the terminal connected to the base station connected to the second-standard main apparatus or the terminal as connected to the base station connected to another second-standard main apparatus connected to the second-standard main apparatus is output from the interface included in the controller according to the specification of the interface, and
  the control data interface comprises a second converter configured to convert the second direction call control data supplied from the interface included in the controller according to the specification of the interface to make the second direction call control data be pursuant to a specification of the first-standard main apparatus.

{Supplementary Note 17}

The inter-main-apparatus interface method according to any one of Supplementary notes 12 to 16, further comprising:
  a first frame format converting step, in which the content data interface converts a frame format of content data supplied from the first-standard main apparatus from a frame format of the first-standard main apparatus to a frame format of the second-standard main apparatus;
  a second frame format converting step, in which the content data interface receives content data that is demultiplexed in the second-standard main apparatus and to be supplied to the first-standard main apparatus and converts a frame format of the received content data from the frame format of the second-standard main apparatus to the frame format of the first-standard main apparatus,
  the second-standard main apparatus becomes able to multiplex the content data supplied from the first-standard main apparatus with other content data on the basis of the conversion of the first frame format converter, and
  the first-standard main apparatus becomes able to multiplex the content data supplied from the second-standard main apparatus with other content data on the basis of the conversion of the second frame format converter.

{Supplementary Note 18}

The inter-main-apparatus interface method according to any one of Supplementary notes 12 to 17, further comprising:
  a step, in which a clock interface enables the second-standard main apparatus to operate using a clock signal as generated by the first-standard main apparatus.

{Supplementary Note 19}

The inter-main-apparatus interface method according to any one of Supplementary notes 12 to 18, wherein
  the control data and the content data supplied from the first-standard main apparatus to the second-standard main apparatus are multiplexed, further comprising:
  a demultiplexing step of perform demultiplexing of the multiplexed control data and content data.

{Supplementary Note 20}

The inter-main-apparatus interface method according to any one of Supplementary notes 12 to 18, further comprising:
  a step of multiplexing the control data and the content data which are to be supplied from the second-standard main apparatus to the first-standard main apparatus, wherein
  the control data and the content data multiplexed by the multiplexer are supplied to the first-standard main apparatus.

{Supplementary Note 21}

An inter-main-apparatus interface program for causing a computer to function as an inter-main-apparatus interface, the program causing the computer to function as:
  a control data interface provided between a first-standard main apparatus and a second-standard main apparatus for operating a controller included in the second-standard main apparatus on the basis of control data supplied from the first-standard main apparatus; and
  a content data interface provided between the first-standard main apparatus and the second-standard main apparatus for enabling the second-standard main apparatus, as controlled by the controller operating on the basis of the control data, to relay, by multiplexing and demultiplexing, content data sent and received by a base station connected to the first-standard main apparatus and content data sent and received by a base station connected to the second-standard main apparatus.

{Supplementary Note 22}

The inter-main-apparatus interface program according to Supplementary note 21, wherein
  the control data includes main control data for enabling the second-standard main apparatus, as controlled by the controller operating on the basis of the control data, to relay, by multiplexing and demultiplexindg, content data sent and received by the base station connected to the first-standard main apparatus and content data sent and received by the base station connected to the second-standard main apparatus.

{Supplementary Note 23}

The inter-main-apparatus interface program according to Supplementary note 21 or 22, wherein
  the control data includes a first direction call control data supplied from the first-standard main apparatus to the second-standard main apparatus among call control data for controlling a call between a terminal connected to the base station connected to the first-standard main apparatus and a terminal connected to the base station connected to the second-standard main apparatus or a terminal connected to a base station connected to another second-standard main apparatus connected to the second-standard main apparatus.

{Supplementary Note 24}

The inter-main-apparatus interface program according to any one of Supplementary notes 21 to 23, wherein the control data interface comprises a first converter configured to convert the control data supplied from the first-standard main apparatus to make the control data be pursuant to a specification of an interface included in the controller, and the control data becoming pursuant to the specification of the interface by the first converter is supplied to the controller via the interface.

{Supplementary Note 25}

The inter-main-apparatus interface program according to any one of Supplementary notes 21 to 24, wherein a second direction call control data supplied from the second-standard main apparatus to the first-standard main apparatus among call control data for controlling a call between the terminal connected to the base station connected to the first-standard main apparatus and the terminal connected to the base station connected to the second-standard main apparatus or the terminal as connected to the base station connected to another second-standard main apparatus connected to the second-standard main apparatus is output from the interface included in the controller according to the specification of the interface, and the control data interface comprises a second converter configured to convert the second direction call control data supplied from the interface included in the controller according to the specification of the interface to make the second direction call control data be pursuant to a specification of the first-standard main apparatus.

{Supplementary Note 26}

The inter-main-apparatus interface program according to any one of Supplementary notes 21 to 25, wherein the content data interface comprises:

a first frame format converter configured to convert a frame format of content data supplied from the first-standard main apparatus from a frame format of the first-standard main apparatus to a frame format of the second-standard main apparatus; and a second frame format converter configured to receive content data that is demultiplexed in the second-standard main apparatus and to be supplied to the first-standard main apparatus and convert a frame format of the received content data from the frame format of the second-standard main apparatus to the frame format of the first-standard main apparatus, the conversion of the first frame format converter enables the second-standard main apparatus to multiplex the content data supplied from the first-standard main apparatus with other content data, and the conversion of the second frame format converter enables the first-standard main apparatus to multiplex the content data supplied from the second-standard main apparatus with other content data.

{Supplementary Note 27}

The inter-main-apparatus interface program according to any one of Supplementary notes 21 to 26, the program further causing the computer to function as a clock interface for enabling the second-standard main apparatus to operate using a clock signal generated by the first-standard main apparatus.

{Supplementary Note 28}

The inter-main-apparatus interface program according to any one of Supplementary notes 21 to 27, wherein the control data and the content data as supplied from the first-standard main apparatus to the second-standard main apparatus are multiplexed, the program further causing the computer to function as a demultiplexer configured to demultiplex the multiplexed control data and content data.

{Supplementary Note 29}

The inter-main-apparatus interface program according to any one of Supplementary notes 21 to 27, further causing the computer to function as a multiplexer configured to multiplex the control data and the content data which are to be supplied from the second-standard main apparatus to the first-standard main apparatus, wherein the control data and the content data multiplexed by the multiplexer are supplied to the first-standard main apparatus.

The present application claims the priority based on Japanese Application No. 2012-189662 filed on Aug. 30, 2012, the disclosure of which is all incorporated herein.

INDUSTRIAL APPLICABILITY

The present invention can be utilized for connecting one-standard main apparatus to another-standard main apparatus.

REFERENCE SIGNS LIST

101: First-standard main apparatus
103: Controller
105: Interface for extension
107: First connection card
109: Second connection card
901-1: First second-standard main apparatus
901-2: Second second-standard main apparatus
901-N: Nth second-standard main apparatus
903-1 to 903-N: Controller

What is claimed is:

1. An inter-main-apparatus interface device, comprising:
a control data interface provided between a first-standard main apparatus and a second-standard main apparatus for operating a controller included in the second-standard main apparatus on the basis of control data supplied from the first-standard main apparatus; and
a content data interface provided between the first-standard main apparatus and the second-standard main apparatus for enabling the second-standard main apparatus, as controlled by the controller operating on the basis of the control data, to relay, content data sent and received by a first base station connected to the first-standard main apparatus and content data sent and received by a second base station connected to the second-standard main apparatus, wherein
the control data interface comprises a first converter configured to convert the control data supplied from the first-standard main apparatus to make the control data be pursuant to a format of a hardware-firmware interface within the controller included in the second-standard apparatus, and
the control data pursuant to the format of the hardware-firmware interface supplied to the controller via the hardware-firmware interface.

2. The inter-main-apparatus interface device according to claim 1, wherein
the control data includes main control data for enabling the second-standard main apparatus, as controlled by the controller operating on the basis of the control data, to relay, by multiplexing and demultiplexing, content data sent and received by the first base station connected to the first-standard main apparatus and content data sent and received by the second base station connected to the second-standard main apparatus.

3. The inter-main-apparatus interface device according to claim 1, wherein
the control data includes a first direction call control data supplied from the first-standard main apparatus to the second-standard main apparatus among call control data for controlling a call between a terminal connected to the first base station connected to the first-standard main apparatus and a terminal connected to the second base station connected to the second-standard main apparatus or a terminal connected to a third base station connected to another second-standard main apparatus connected to the second-standard main apparatus.

4. The inter-main-apparatus interface device according to claim 1, wherein
a second direction call control data supplied from the second-standard main apparatus to the first-standard main apparatus among call control data for controlling a call between the terminal connected to the first base station connected to the first-standard main apparatus and the terminal connected to the second base station connected to the second-standard main apparatus or the terminal as connected to a third base station connected to another second-standard main apparatus connected to the second-standard main apparatus is output from the interface included in the controller according to the specification of the interface, and
the control data interface comprises a second converter configured to convert the second direction call control data supplied from the interface included in the controller according to the specification of the interface to make the second direction call control data be pursuant to a specification of the first-standard main apparatus.

5. The inter-main-apparatus interface device according to claim 1, wherein
the content data interface comprises:
a first frame format converter configured to convert a frame format of content data supplied from the first-standard main apparatus from a frame format of the first-standard main apparatus to a frame format of the second-standard main apparatus; and
a second frame format converter configured to receive content data that is demultiplexed in the second-standard main apparatus and to be supplied to the first-standard main apparatus and convert a frame format of the received content data from the frame format of the second-standard main apparatus to the frame format of the first-standard main apparatus,
the conversion of the first frame format converter enables the second-standard main apparatus to multiplex the content data supplied from the first-standard main apparatus with other content data, and
the conversion of the second frame format converter enables the first-standard main apparatus to multiplex the content data supplied from the second-standard main apparatus with other content data.

6. The inter-main-apparatus interface device according to claim 1, further comprising:
a clock interface for enabling the second-standard main apparatus to operate using a clock signal generated by the first-standard main apparatus.

7. The inter-main-apparatus interface device according to claim 1, wherein
the control data and the content data supplied from the first-standard main apparatus to the second-standard main apparatus are multiplexed,
the inter-main-apparatus interface device further comprises a demultiplexer configured to demultiplex the multiplexed control data and content data.

8. The inter-main-apparatus interface device according to claim 1, further comprising:
a multiplexer configured to multiplex the control data and the content data which are to be supplied from the second-standard main apparatus to the first-standard main apparatus, wherein the control data and the content data multiplexed by the multiplexer are supplied to the first-standard main apparatus.

9. A main-apparatus system comprising the inter-main-apparatus interface device according to claim 1, the first-standard main apparatus and the second-standard main apparatus.

10. The main-apparatus system according to claim 9, further comprising:
one or more other second-standard main apparatuses controlled by the controller of the second-standard main apparatus.

11. An inter-main-apparatus interface method, comprising the steps of:
that a controller included in a second-standard main apparatus is operated on the basis of control data supplied from a first-standard main apparatus through a control data interface provided between the first-standard main apparatus and the second-standard main apparatus;
that the second-standard main apparatus, as controlled by the controller being operated on the basis of the control data, relays content data sent and received by a first base station connected to the first-standard main apparatus and content data sent and received by a second base station connected to the second-standard main apparatus using a content data interface provided between the first-standard main apparatus and the second-standard main apparatus; and
that the control data interface converts the control data supplied from the first-standard main apparatus to make the control data be pursuant to a format of a hardware-firmware interface within the controller included in the second-standard apparatus, wherein
the control data pursuant to the format of the hardware-firmware interface supplied to the controller via the hardware-firmware interface.

12. A non-transitory computer-readable medium on which a program is recorded, said program, when executed, causing a computer to function as an inter-main-apparatus interface, the program causing the computer to function as:
a control data interface provided between a first-standard main apparatus and a second-standard main apparatus for operating a controller included in the second-standard main apparatus on the basis of control data supplied from the first-standard main apparatus; and
a content data interface provided between the first-standard main apparatus and the second-standard main apparatus for enabling the second-standard main apparatus, as controlled by the controller operating on the basis of the control data, to relay content data sent and received by a first base station connected to the first-standard main apparatus and content data sent and received by a second base station connected to the second-standard main apparatus, wherein the control data interface converts the control data supplied from the first-standard main apparatus to make the control data be pursuant to a format of a hardware-firmware interface within the controller included in the second-standard apparatus, and the control data pursuant to the format of the hardware-firmware interface supplied to the controller via the hardware-firmware interface.

13. The inter-main-apparatus interface method according to claim 11, wherein the control data includes main control data for enabling the second-standard main apparatus, as controlled by the controller operating on the basis of the control data, to relay, by multiplexing and demultiplexing, content data sent and received by the first base station connected to the first-standard main apparatus and content data sent and received by the second base station connected to the second-standard main apparatus.

14. The inter-main-apparatus interface method according to claim 11, wherein the control data includes a first direction call control data supplied from the first-standard main apparatus to the second-standard main apparatus among call control data for controlling a call between a terminal connected to the first base station connected to the first-standard main apparatus and a terminal connected to the second base station connected to the second-standard main apparatus or a terminal connected to a third base station connected to another second-standard main apparatus connected to the second-standard main apparatus.

15. The inter-main-apparatus interface method according to claim 11, wherein a second direction call control data supplied from the second-standard main apparatus to the first-standard main apparatus among call control data for controlling a call between the terminal connected to the first base station connected to the first-standard main apparatus and the terminal connected to the second base station connected to the second-standard main apparatus or the terminal as connected to a third base station connected to another second-standard main apparatus connected to the second-standard main apparatus is output from the interface included in the controller according to the specification of the interface, and the control data interface comprises a second converter configured to convert the second direction call control data supplied from the interface included in the controller according to the specification of the interface to make the second direction call control data be pursuant to a specification of the first-standard main apparatus.

16. The inter-main-apparatus interface method according to claim 11, further comprising:

a first frame format converting step, in which the content data interface converts a frame format of content data supplied from the first-standard main apparatus from a frame format of the first-standard main apparatus to a frame format of the second-standard main apparatus;

a second frame format converting step, in which the content data interface receives content data that is demultiplexed in the second-standard main apparatus and to be supplied to the first-standard main apparatus and converts a frame format of the received content data from the frame format of the second: standard main apparatus to the frame format of the first-standard main apparatus, the second-standard main apparatus becomes able to multiplex the content data supplied from the first-standard main apparatus with other content data on the basis of the conversion of the first frame format converter, and the first-standard main apparatus becomes able to multiplex the content data supplied from the second-standard main apparatus with other content data on the basis of the conversion of the second frame format converter.

17. The inter-main-apparatus interface method according to claim 11, further comprising:

a step, in which a clock interface enables the second-standard main apparatus to operate using a clock signal as generated by the first-standard main apparatus.

18. The inter-main-apparatus interface method according to claim 11, wherein the control data and the content data supplied from the first-standard main apparatus to the second-standard main apparatus are multiplexed, further comprising:

a demultiplexing step of perform demultiplexing of the multiplexed control data and content data.

19. The inter-main-apparatus interface method according to claim 11, further comprising:

a multiplexing step of perform multiplexing of the control data and the content data which are to be supplied from the second-standard main apparatus to the first-standard main apparatus, wherein the control data and the content data multiplexed by the multiplexer are supplied to the first-standard main apparatus.

* * * * *